(12) United States Patent
Kim et al.

(10) Patent No.: US 7,515,606 B2
(45) Date of Patent: Apr. 7, 2009

(54) UWB-BASED WIRELESS BRIDGE

(75) Inventors: Jong-Won Kim, Daejon (KR);
Bong-Hyuk Park, Daejon (KR);
Yong-Il Jun, Daejon (KR); Hyeong-Ho Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 653 days.

(21) Appl. No.: 10/964,410

(22) Filed: Oct. 12, 2004

(65) Prior Publication Data
US 2005/0141553 A1 Jun. 30, 2005

(30) Foreign Application Priority Data
Dec. 26, 2003 (KR) ............ 10-2003-0097788
Jun. 8, 2004 (KR) ............ 10-2004-0041727

(51) Int. Cl.
*H04J 3/22* (2006.01)

(52) U.S. Cl. ............ 370/466; 370/315; 370/324; 370/445

(58) Field of Classification Search ......... 370/299, 370/300, 315, 324, 445, 466
See application file for complete search history.

(56) References Cited

U.S. PATENT DOCUMENTS 6,754,185 B1 * 6/2004 Banerjee et al. ............ 370/282
7,177,341 B2 * 2/2007 McCorkle ............ 375/130
7,269,260 B2 * 9/2007 Adachi et al. ............ 380/270
2003/0081630 A1 5/2003 Mowery et al.

FOREIGN PATENT DOCUMENTS

KR 1020020064271 A 8/2002
WO WO 02/33902 A1 4/2002

OTHER PUBLICATIONS

"Wideband Wireless Home Network Apparatus Based on Wireless 1394 Scheme,"; Jeon, Ho-In;*Korean Institute of Communication and Science: Information Communication*, vol. 19, No. 5, 2002, pp. 63-78.

* cited by examiner

*Primary Examiner*—Ricky Ngo
*Assistant Examiner*—Chandrahas Patel
(74) *Attorney, Agent, or Firm*—Blakely, Sokoloff, Taylor & Zafman LLP (57) ABSTRACT

An ultra wide band (UWB)-based wireless bridge converts wired serial data into a UWB signal with a quality of service, transmits it wirelessly, and inverts the UWB signal into wired serial data. The UWB-based wireless bridge includes: a physical layer processing portion; a protocol converting block; a UWB signal transceiving portion; and a control portion.

9 Claims, 7 Drawing Sheets

UWB-BASED WIRELESS BRIDGE

FIELD OF THE INVENTION

The present invention relates to a wireless bridge based on an ultra wide band (UWB); and, more particularly, to a UWB-based wireless bridge that converts wired serial data such as wired Institute of Electrical and Electronics Engineers (IEEE) 1394 data into UWB signals, which are signals with a secure quality of service (QoS), transmits the UWB signals, inverts the UWB signals into wired serial data, and provides the wired serial data.

DESCRIPTION OF RELATED ART

The present invention will be described hereinafter by taking an Institute of Electrical and Electronics Engineers (IEEE) 1394 wireless bridge as an example.

Enhanced Integrated Drive Electronics (EIDE), a widely used peripheral interface at present, is slow and has a limited extension. On the contrary, Small Computer System Interface (SCSI) has an excellent extension but it is relatively expensive and has no firm standard so that protocols and drivers are different according to manufacturing companies. It is understood that the extension is easy theoretically, but it is practically troublesome to carry out extension due to properties between peripherals. A new standard protocol developed to solve the aforementioned problems and connect peripherals, especially high-speed peripherals, in one cable is the IEEE 1394.

The IEEE 1394 is a new serial bus interface protocol suggested by an association of the Apple Company and the Texas Instrument (TI) company. It is developed in a code name of "FireWire" and officially agreed on in the IEEE in December 1995 to become a standard. With the IEEE 1394, it is possible to connect and use peripherals, especially high-speed peripherals, in one cable conveniently.

Meanwhile, it is common people carry electronic devices such as a laptop computer, a mobile phone, a personal digital assistant (PDA), a Motion Picture Experts Group (MPEG) audio layer 3 (MP3) player and the like with them. It is, however, quite troublesome to connect all of them through wire. Moreover, it is almost impossible to connect and cooperate them with each other due to incompatible applications. Technology that removes cables between individual devices by building a wireless network and makes it possible to exchange data between applications is called Wireless Personal Area Network (WPAN).

The WPAN, an Ad Hoc data communication system that makes several devices communicate with each other, aims to transmit data between a relatively small number of users within a relatively short range, e.g., in a radius of 10 m. Also, the WPAN is inexpensive and efficient technology with no dependency on any infrastructure. It can be applied to diverse devices including a personal computer, a portable computer, a personal digital assistant (PDA), a printer, a microphone, a speaker, a headset, a bar code reader, a sensor, a display device, a mobile communication terminal and the like. The WPAN can be embodied effectively by using an ultra wide band (UWB) communication technology.

The UWB communication technology has been used to communication systems related to national security and radar which require high-level security since 1950. By the time of 1990's, there have been efforts to apply the UWB communication technology to commercial communication systems. Consequently, the Federal Communication Committee (FCC) approved the use of the UWB communication technology in frequency bands higher than 3.1 GHz in February 2002 and researches are conducted actively to apply the UWB communication technology to commercial systems in many companies and institutes. The standardization of the UWB communication is underway actively by an IEEE 802.15.3 working group, a group mainly in charge of standardization related to wireless personal communication.

Generally, the UWB communication technology uses a wide bandwidth 25% more than a center frequency. Differently from most conventional wireless technologies in which signals are transmitted after carrier modulation, the UWB communication technology does not use carriers. Therefore, it does not require a carrier frequency and a phase restoration process that are required in general narrowband communication technologies. Thus, wireless communication can be embodied more simply. The UWB communication technology has an advantage that it can share and use a frequency band that is already occupied and used. Since it does not require a frequency shifting process in a transmitter/receiver, which is different from the conventional narrowband communication technology, a communication system can be embodied at relatively low cost. In addition, the UWB communication technology can secure a desired transmission rate and transmission range with relatively low power consumption. So, it is regarded suitable to a system supporting a high data transmission rate. The advantages of the UWB communication technology can be applied to a next-generation wireless personal communication that requires a short-range ultra high transmission rate.

To connect wired peripherals to the WPAN based on the IEEE 1394 as well as wireless peripherals, a wireless bridge for converting IEEE 1394 data, wired data, to radio signals and vice versa is required. Conventionally, a bridge is a piece of hardware for transmitting packet signals based on a medium access control (MAC) address of a network and it connects two Local Area Networks (LANs) using the same protocol.

Generally, a wireless 1394 bridge of the IEEE 802.11b is used to convert the IEEE 1394 data, wired data, into radio signals. However, the wireless 1394 bridge of the IEEE 802.11b provides a very slow transmission rate, which is a maximum rate of 11 Mbps in a 2.4 GHz band, and the quality of service (QoS) is insecure. So, it is not suitable for the transmission of real-time isochronous audio/video (A/V) data.

Therefore, the UWB-based wireless bridge supporting a high data transmission rate is in desperate need to secure a desired transmission rate and a desired transmission range with relatively small power consumption.

SUMMARY OF THE INVENTION

It is, therefore, an object of the present invention to provide a wireless bridge based on an ultra wide band (UWB) that converts wired serial data into UWB signals, which are signals with a secure quality of service (QoS), transmits the UWB signals, inverts the UWB signals into wired serial data, and provides the wired serial data.

It is another object of the present invention to provide an UWB-based wireless bridge that converts wired serial data such as wired Institute of Electrical and Electronics Engineers (IEEE) 1394 data into UWB signals, which are signals with a secure quality of service (QoS), transmits the UWB signals wirelessly at a transmission rate of 110 to 480 Mbps in a band of 3.1 to 10.6 GHz, inverts the UWB signals into wired IEEE 1394 data, and provides the wired IEEE 1394 data.

In accordance with an aspect of the present invention, there is provided an ultra wide band (UWB)-based wireless bridge, including: a physical layer processing unit for encoding a physical layer signal transmitted from a serial bus device connected through wire into link layer data and decoding link layer data transmitted from a protocol converting unit into a physical layer signal; the protocol converting unit for separating link layer data transmitted from the physical layer processing unit into isochronous data and asynchronous data, performing path establishment and synchronization, multiplexing the isochronous data and the asynchronous data into protocol adaptation layer (PAL) data, and converting the PAL data into media access control (MAC) data, converting MAC data transmitted from a UWB signal transceiving unit into PAL data, separating the PAL data into isochronous data and asynchronous data, performing path establishment and synchronization, and multiplexing the isochronous data and asynchronous data into link layer data; the UWB signal transceiving unit for converting MAC data transmitted from the protocol converting unit into UWB signals, transmitting the UWB signals through an antenna, and converting UWB signals received through the antenna into MAC data; and a controlling unit for controlling and managing the physical layer processing unit, the protocol converting unit, and the UWB signal transceiving unit.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. Thus, those of ordinary skill in the art can embody the technical conception of the present invention easily. Also, if any detailed description on conventional technology related to the present invention is considered to blur the point of the present invention, it will be omitted herein.

Provided in the present invention is an ultra wide band (UWB)-based wireless bridge that has a high wireless transmission rate of 110 to 480 Mbps by using a USB-Based baseband pulse transceiver, secures the quality of service (QoS) by using an Institute of Electrical and Electronics Engineers (IEEE) 802.15.3 media access control (MAC), and transmits real-time isochronous audio/video (A/V) data as well as asynchronous data.

Figure 1:
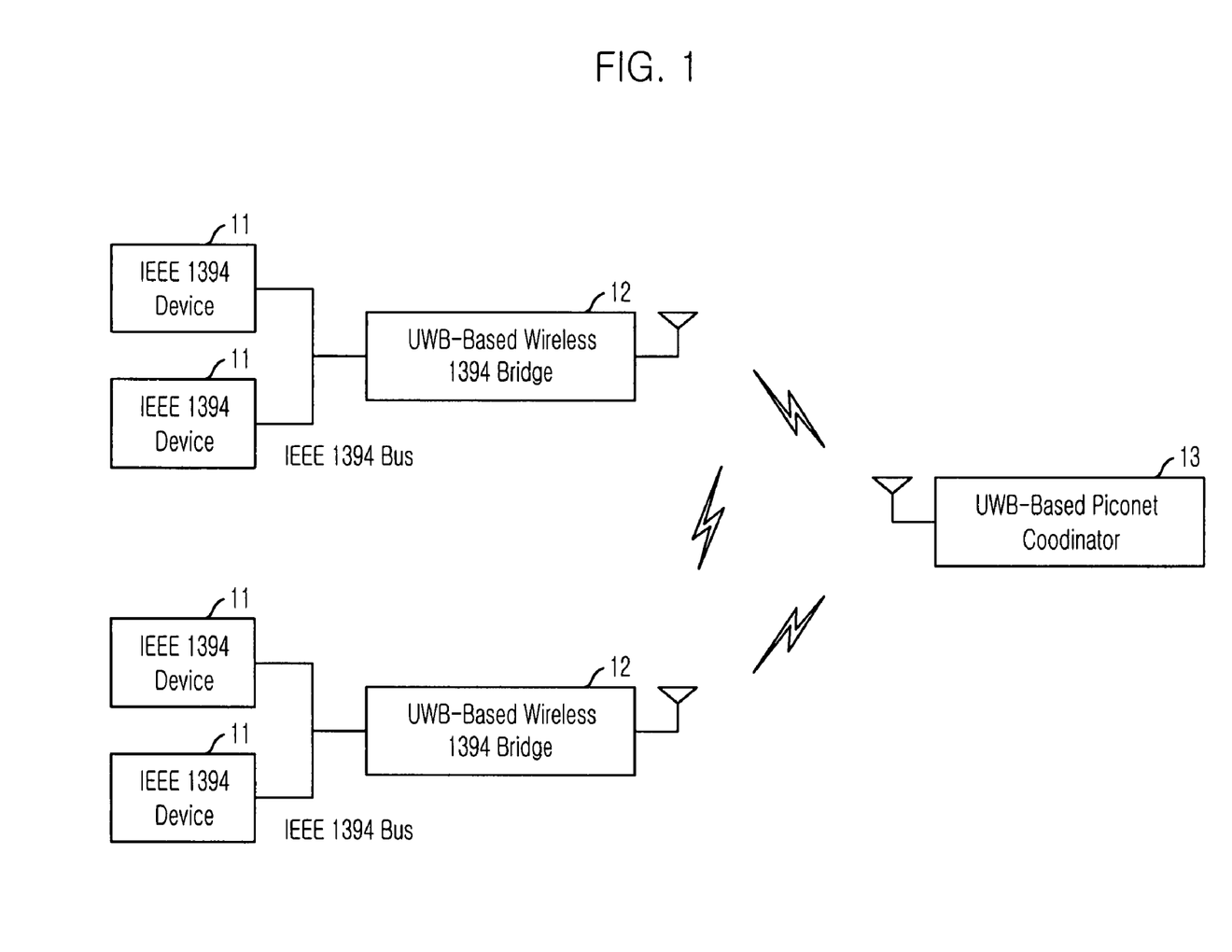
FIG. 1 is a block diagram showing a Wireless Personal Area Network (WPAN) to which the present invention is applied in accordance with an embodiment of the present invention.

FIG. 1 is a block diagram showing a Wireless Personal Area Network (WPAN) to which the present invention is applied in accordance with an embodiment of the present invention.

As shown, the WPAN system includes a UWB-based piconet coordinator 13, a UWB-based wireless 1394 bridge 12, and a plurality of IEEE 1394 devices 11.

The IEEE 1394 devices 11 are digital home electronic appliances with an IEEE 1394 port inside, such as a digital camcorder, a High Definition Television (HDTV), a home theater, a personal computer (PC) and the like. They are connected to the UWB-based wireless 1394 bridge 12 through an IEEE 1394 bus and transmit isochronous audio/video data as well as asynchronous data in real-time at a high transmission rate of 100 Mbps to 3.2 Gbps.

In addition, the UWB-based wireless 1394 bridge 12 is connected to the IEEE 1394 devices 11 through wires and it transmits/receives UWB signals with the UWB-based piconet coordinator 13 and other UWB-based wireless 1394 bridges 12. That is, the UWB-based wireless 1394 bridge 12 converts IEEE 1394 data from the IEEE 1394 devices 11 into dual-band UWB signals and inverts the dual-band UWB signals into IEEE 1394 data.

Meanwhile, the UWB-based piconet coordinator 13 performs the roles of a WPAN operator and a scheduler. The WPAN begins from the formation of a piconet, which is a connection of two or more devices. When a piconet is formed, a device of the piconet becomes a piconet coordinator to thereby provide basic timing, and controls QoS requirements. This device is the UWB-based piconet coordinator 13.

Figure 5:
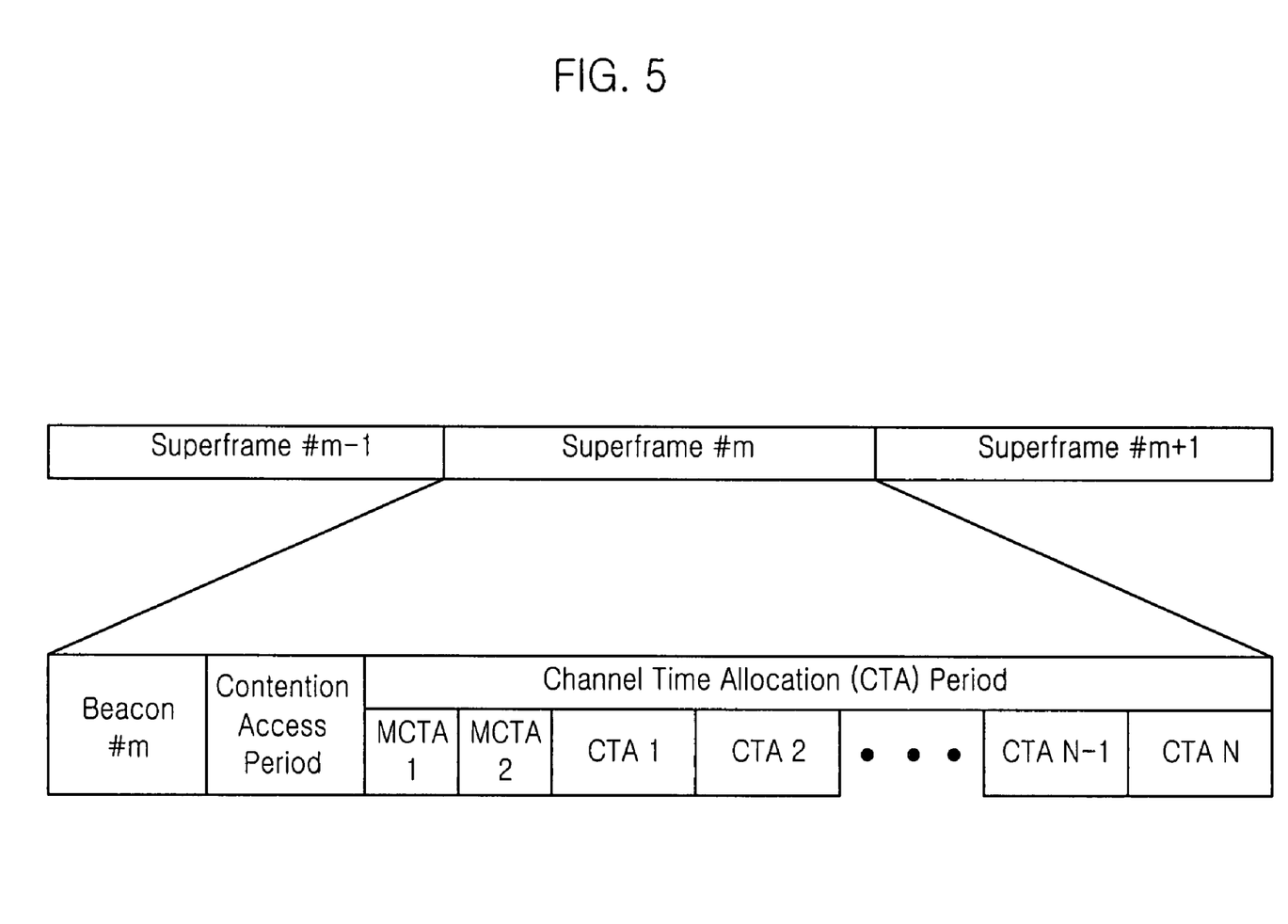
FIG. 5 is a diagram illustrating an IEEE 802.15.3 piconet superframe which is used in the present invention.

The UWB-based piconet coordinator 13 provides basic network synchronization time to the UWB-based wireless 1394 bridge 12 and other IEEE 1394 devices 11 by generating an IEEE 802.15.3 piconet superframe as illustrated in FIG. 5, establishes connection based on channel time (CT) resources for data transmission and a pre-established QoS policy, and performs resource allocation and manages power save mode in the piconet.

Meanwhile, the IEEE 802.15.3 network, to which the technology of the present invention is applied, is a network based on access points (AP) but an Ad Hoc network. The IEEE 802.15.3 network adopts the Time Division Multiple Access (TDMA) scheme as its MAC scheme and it has a structure where MAC frames are inserted to a temporal arrangement called a 'superframe.' In other words, as depicted in FIG. 5, a superframe is formed of three blocks: a beacon for describing control information, a contention access (CA) period in which random access control is executed, and a channel time allocation (CTA) period for storing data.

Hereafter, the operation of the UWB-based wireless 1394 bridge 12 of the present invention will be described with reference to FIG. 2.

Figure 2:
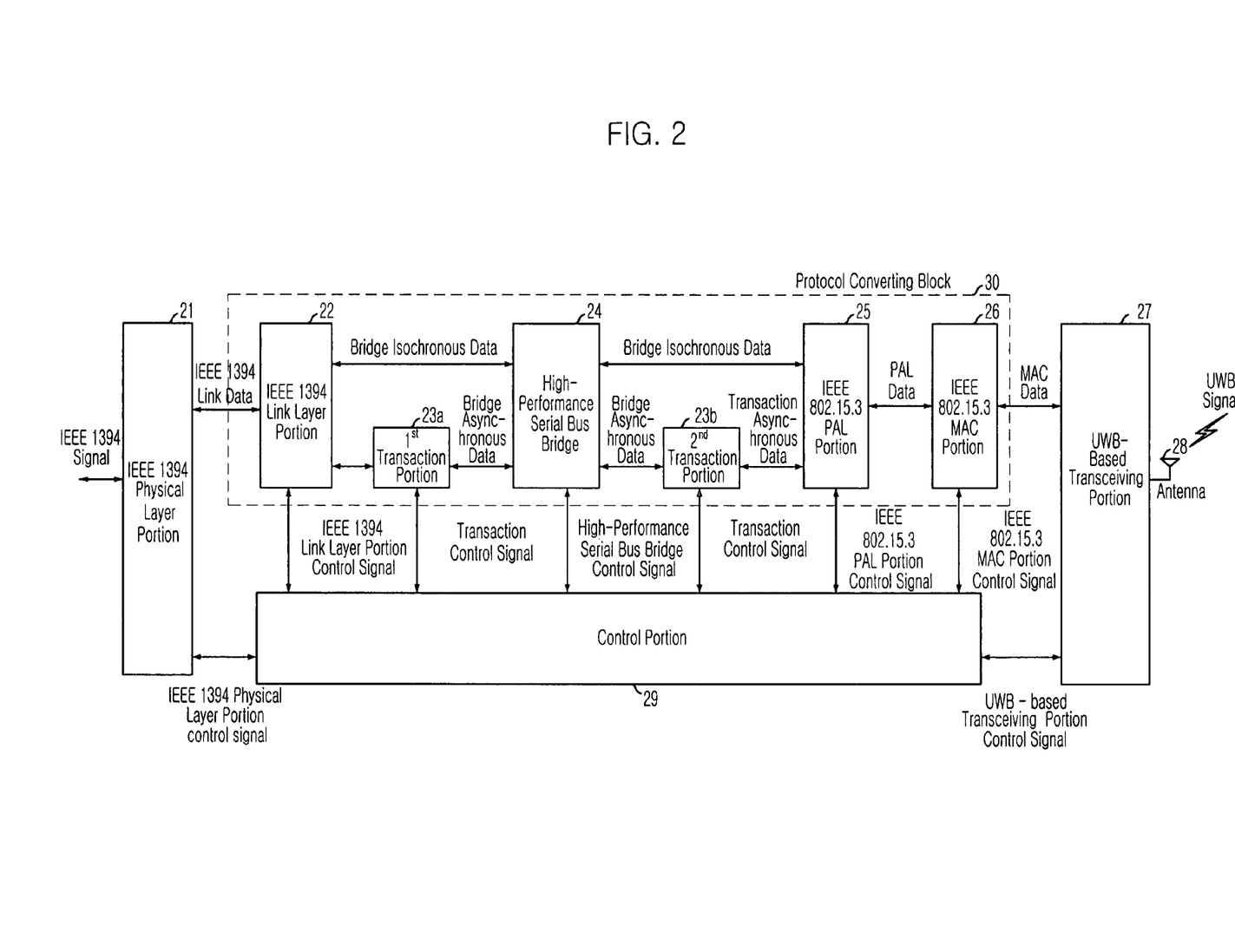
FIG. 2 is a block diagram illustrating a wireless bridge based on an ultra wide band (UWB) in accordance with an embodiment of the present invention.

FIG. 2 is a block diagram illustrating a wireless bridge based on an ultra wide band (UWB) in accordance with an embodiment of the present invention.

As shown, the UWB-based wireless 1394 bridge 12 includes an IEEE 1394 physical layer portion 21, a protocol converting block 30, a UWB-based transceiving portion 27, and a control portion 29.

The IEEE 1394 physical layer portion 21 transmits/receives IEEE 1394 signals from the IEEE 1394 devices 11 through IEEE 1394 buses, encodes/decodes IEEE 1394 link data of 100 Mbps to 3.2 Gbps, and performs bus arbitration.

The protocol converting block 30 separates link layer data from the IEEE 1394 physical layer portion 21 into isochronous data and asynchronous data and performs path establishment and synchronization; multiplexes the isochronous data and asynchronous data into protocol adaptation layer (PAL) data; converts the PAL data into MAC data; converts the MAC data from the UWB-based transceiving portion 27 into PAL data; separates the PAL data into isochronous data and asynchronous data and performs path establishment and synchronization; and multiplexes the isochronous data and asynchronous data into link layer data.

As shown in FIG. 2, the protocol converting portion 30 includes an IEEE 1394 link layer portion 22, a first transaction portion 23a, a high-performance serial bus bridge 24, a second transaction portion 23b, an IEEE 802.15.3 PAL portion 25, and an IEEE 802.15.3 MAC portion 26.

The IEEE 1394 link layer portion 22 controls IEEE 1394 cycles and transmits/receives packets. Also, it receives IEEE 1394 link data from the IEEE 1394 physical layer portion 21, separates them into bridge isochronous data and transaction asynchronous data, transmits the bridge isochronous data to the high-performance serial bus bridge 24 and transmits the transaction asynchronous data to the first transaction portion 23a. Conversely, the IEEE 1394 link layer portion 22 transmits to the IEEE 1394 physical layer portion 21 the IEEE 1394 link data which are generated by multiplexing the bridge isochronous data from the high-performance serial bus bridge 24 and the transaction asynchronous data from the first transaction portion 23a.

The first transaction portion 23a converts the asynchronous data (read request/response packet, write request/response packet, and lock request/response packet) from the IEEE 1394 link layer portion 22 into asynchronous sub-action data (read request/response sub-action data, write request/response sub-action data, and lock request/response sub-action data), and transmits the asynchronous sub-action data to the high-performance serial bus bridge 24. Also, first transaction portion 23a converts the asynchronous sub-action data (read request/response sub-action data, write request/response sub-action data, and lock request/response sub-action data) from the high-performance serial bus bridge 24 into asynchronous data (read request/response packet, write request/response packet, and lock request/response packet) and transmits the asynchronous data to the IEEE 1394 link layer portion 22.

The high-performance serial bus bridge 24 receives the asynchronous data and isochronous data from the first transaction portion 23a and the IEEE 1394 link layer portion 22, sets up a path by analyzing their frame information, and performs synchronization based on cycle timer. Also, the high-performance serial bus bridge 24 receives the asynchronous sub-action data and isochronous data from the second transaction portion 23b and the IEEE 802.15.3 PAL portion 25, sets up a path by analyzing their frame information, and performs synchronization based on cycle timer.

The high-performance serial bus bridge 24 performs net update, in which bridge portals of connected serial buses cooperates with each other and form a network when the network structure is changed, and forms global node identification (ID).

The second transaction portion 23b converts the asynchronous sub-action data (read request/response sub-action data, write request/response sub-action data, and lock request/response sub-action data) from the high-performance serial bus bridge 24 into asynchronous data (read request/response packet, write request/response packet, and lock request/response packet) and transmits the asynchronous data to the IEEE 802.15.3 PAL portion 25. Also, the second transaction portion 23b converts the asynchronous data (read request/response packet, write request/response packet, and lock request/response packet) from the IEEE 802.15.3 PAL portion 25 into asynchronous sub-action data (read request/response sub-action data, write request/response sub-action data, and lock request/response sub-action data), and transmits the asynchronous sub-action data to the high-performance serial bus bridge 24.

Figure 6:
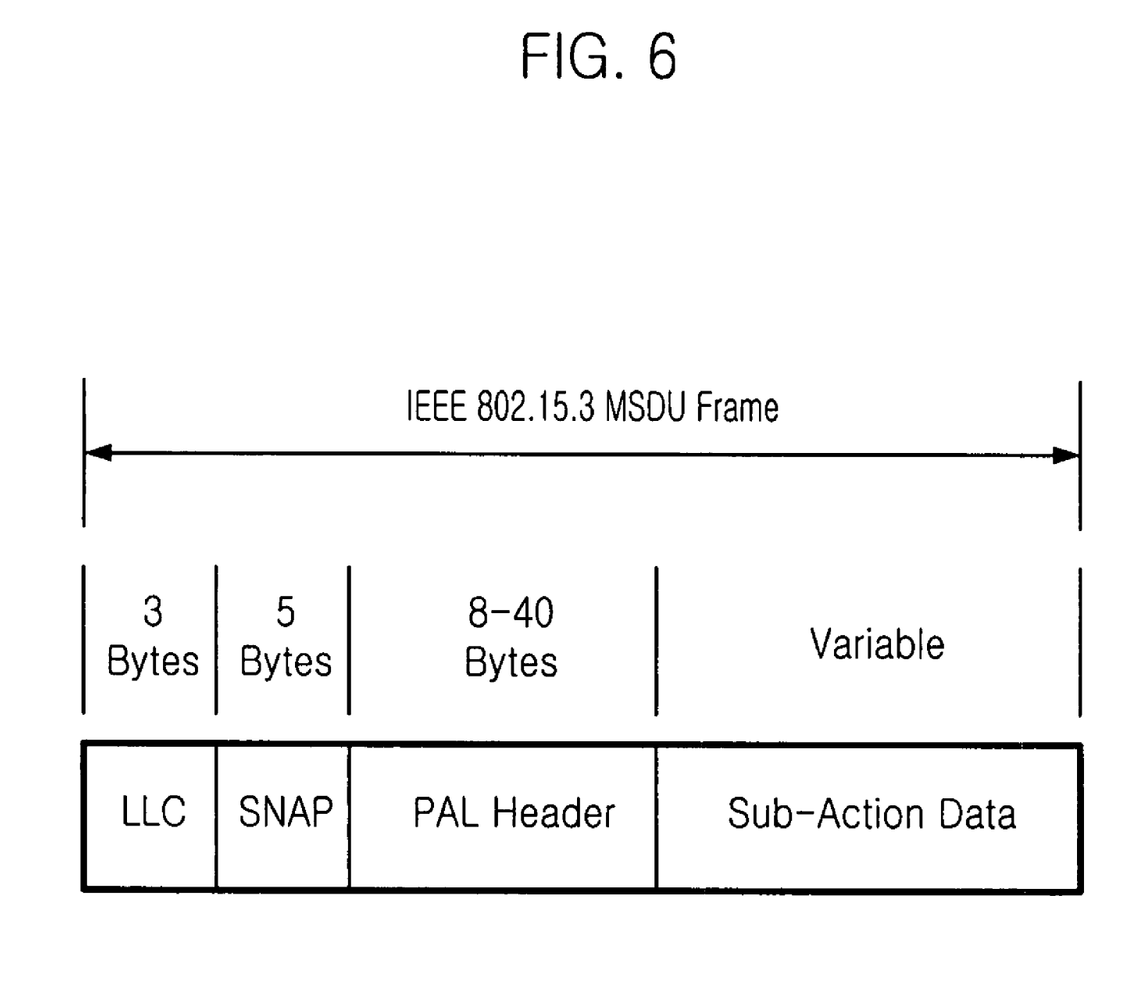
FIG. 6 is a diagram illustrating an IEEE 802.15.3 MSDU frame which is used in the present invention.

The IEEE 802.15.3 PAL portion 25 multiplexes the isochronous data from the high-performance serial bus bridge 24 and the asynchronous data from the second transaction portion 23b, converts them into PAL data of an IEEE 802.15.3 MAC service data unit (MSDU) frame, which is illustrated in FIG. 6, and transmits the PAL data to the IEEE 802.15.3 MAC portion 26.

Conversely, the IEEE 802.15.3 PAL portion 25 separates the PAL data from the IEEE 802.15.3 MAC portion 26 into isochronous data and asynchronous data and transmits the isochronous data to the high-performance serial bus bridge 24 and transmits the asynchronous data to the second transaction portion 23b. Also, it supports management service, transaction service and isochronous service for an application service that operates in an IEEE 1394 environment.

Figure 7:
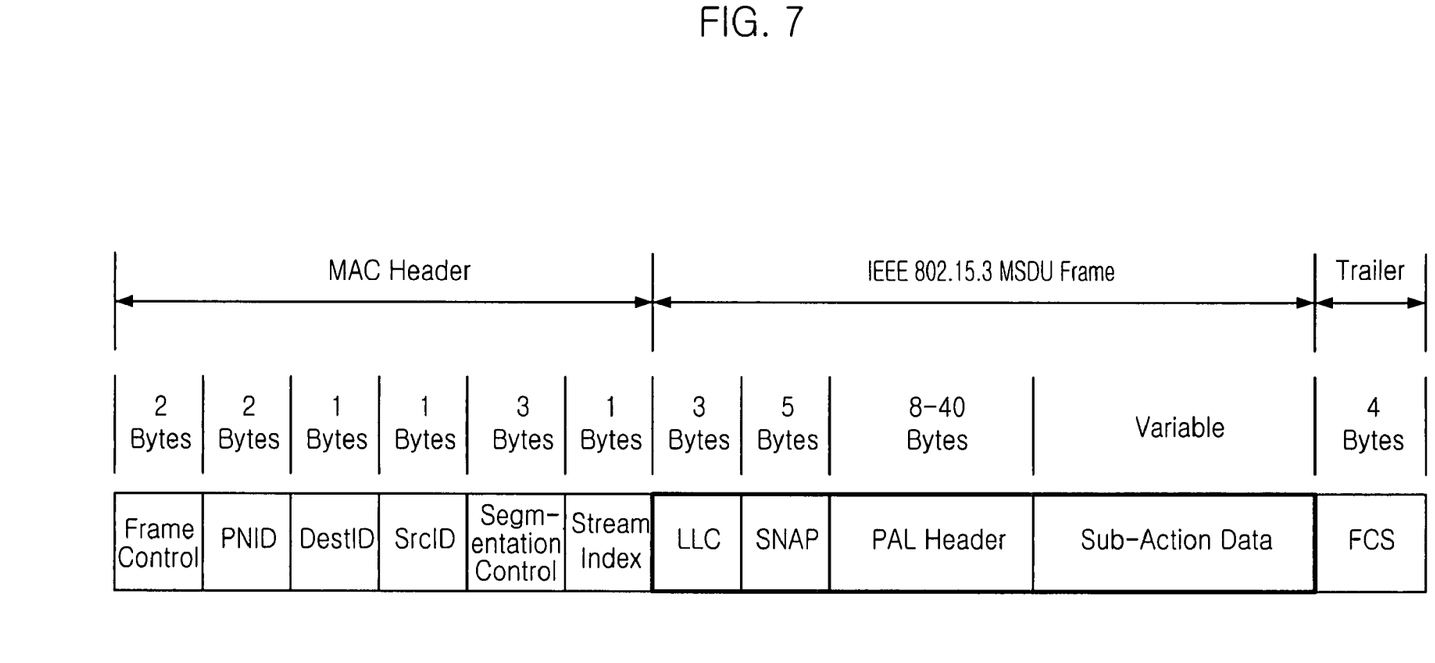
FIG. 7 is a diagram illustrating an IEEE 802.15.3 MPDU frame which is used in the present invention.

The IEEE 802.15.3 MAC portion 26 converts the PAL data of an IEEE 802.15.3 MSDU frame, which is described in FIG. 6, from the IEEE 802.15.3 PAL portion 25 into MAC data of an IEEE 802.15.3 MAC protocol data unit (MPDU) frame, which is described in FIG. 7, and transmits the MAC data to the UWB-based transceiving portion 27. Conversely, the IEEE 802.15.3 MAC portion 26 inverts the MAC data of an IEEE 802.15.3 MPDU frame from the UWB-based transceiving portion 27 into PAL data of the IEEE 802.15.3 MSDU frame and transmits the PAL data to the IEEE 802.15.3 PAL portion 25.

Also, the IEEE 802.15.3 MAC portion 26 makes a plurality of UWB-based wireless 1394 bridges share one radio channel. That is, the IEEE 802.15.3 MAC portion 26 transmits command data and asynchronous data in a carrier sense multiple access with collision avoidance (CSMA/CA) method in a contention access (CA) period based on the IEEE 802.15.3 piconet superframe, and transmits management data, command data, asynchronous data and real-time isochronous audio/video data in support of the QoS in a Time Division Multiple Access (TDMA) method in the basic channel time allocation (CTA) period.

Meanwhile, the UWB-based transceiving portion 27 converts the MAC data of the IEEE 802.15.3 MPDU frame from the IEEE 802.15.3 MAC portion 26 into dual-band UWB signals that provide a transmission rate of 110 to 480 Mbps in a 3.1 to 10.6 GHz and transmits the dual-band UWB signals through an antenna 28; and it inverts the UWB signals received through the antenna 28 into MAC data of the IEEE 802.15.3 MPDU frame and transmits the MAC data to the IEEE 802.15.3 MAC portion 26.

The antenna 28 transmits/receives UWB signals of 3.1 to 10.6 GHz band.

The control portion 29 controls and manages the IEEE 1394 physical layer portion 21, IEEE 1394 link layer portion 22, first transaction portion 23a, second transaction portion 23b, high-performance serial bus bridge 24, IEEE 802.15.3 PAL portion 25, IEEE 802.15.3 MAC portion 26, and UWB-based transceiving portion 27.

Figure 3:
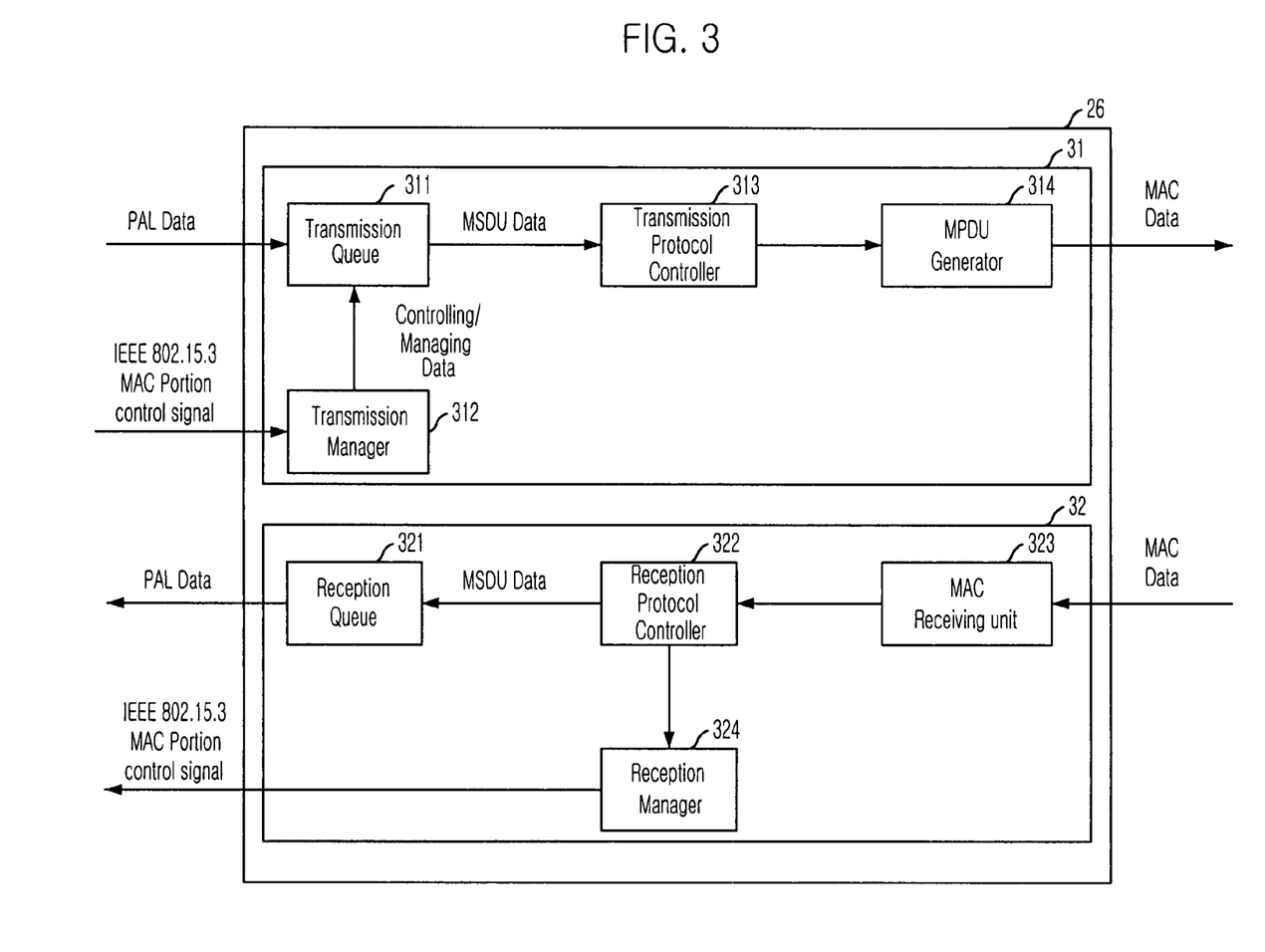
FIG. 3 is a block diagram describing an Institute of Electrical and Electronics Engineers (IEEE) 802.15.3 media access portion in accordance with an embodiment of the present invention.

FIG. 3 is a block diagram describing an IEEE 802.15.3 media access portion in accordance with an embodiment of the present invention.

As shown, the IEEE 802.15.3 MAC portion 26 largely includes a transmission portion 31 and a reception portion 32.

The transmission portion 31 includes a transmission queue 311, a transmission manager 312, a transmission protocol controller 313, and an MPDU generator 314. The reception portion 32 includes a reception queue 321, a reception protocol controller 322, an MAC receiving unit 323, and a reception manager 324.

First, the transmission queue 311 stores the PAL data of the IEEE 802.15.3 MSDU frame from the IEEE 802.15.3 PAL portion 25 temporarily and transmits them to the transmission protocol controller 313 sequentially. It also stores control/management transmission data from the transmission manager 312 temporarily and transmits them to the transmission protocol controller 313 sequentially.

The transmission manager 312 generates control data such as acknowledgement (ACK) frame and management data for communication with the UWB-based piconet coordinator 13 based on the control of the control portion 29 and transmits them to the transmission queue 311.

The transmission protocol controller 313 controls the PAL data of the MSDU frame transmitted from the transmission queue 311 in a CSMA/CA or TDMA method and transmits the PAL data to the MPDU generator 314 so that the UWB-based wireless 1394 bridges 12 can share one radio channel.

In short, transmission protocol controller 313 transmits command data and/or asynchronous data to the MPDU generator 314 among the PAL data of the MSDU frame from the transmission queue 311 based on the CSMA/CA method in the selective CA period which is established in the IEEE 802.15.3 piconet superframe; and transmits command data, management data, asynchronous data and/or real-time isochronous audio/video data to the MPDU generator 314 among the PAL data of the MSDU frame based on the TDMMA method in the basic CTA period.

The MPDU generator 314 generates an MAC header and an MAC trailer based on the protocol control data transmitted from the transmission protocol controller 313, which includes command data, management data, asynchronous data and/or real-time isochronous A/V data. Then, it converts the MAC header and MAC trailer into MAC data of the MPDU frame and transmits the MAC data to the USB-based transceiving portion 27.

Meanwhile, the MAC receiving unit 323 identifies frame address of the MAC data of the IEEE 802.15.3 MPDU frame, which are transmitted from the UWB-based transceiving portion 27, detects redundant frames, and performs a function of frame check sequence (FCS). Then, it removes the MAC header and MAC trailer, converts them into MSDU receiving data, and transmits the MSDU receiving data to the reception protocol controller 322. Here, the FCS means checking a parity added to the end of each frame and cyclic redundancy checking (CRC) information in order to detect an error when data are transmitted on a frame basis in data communication.

The reception protocol controller 322 separates the MSDU data from the MAC receiving unit 323 into control data, management data, asynchronous data, and isochronous data and transmits the asynchronous data and isochronous data to the reception queue 321 and transmits the control data, such as ACK frame, and the management data to the reception manager 324.

The reception queue 321 stores the PAL data from the reception protocol controller 322 temporarily and transmits them to the IEEE 802.15.3 PAL portion sequentially.

The reception manager 324 manages a management information base (MIB) of an MAC layer based on control data and management data transmitted from the reception protocol controller 322, scans UWB-based piconet coordinator, and performs functions of piconet synchronization/combination with other UWB-based devices and authentication-related functions.

Figure 4:
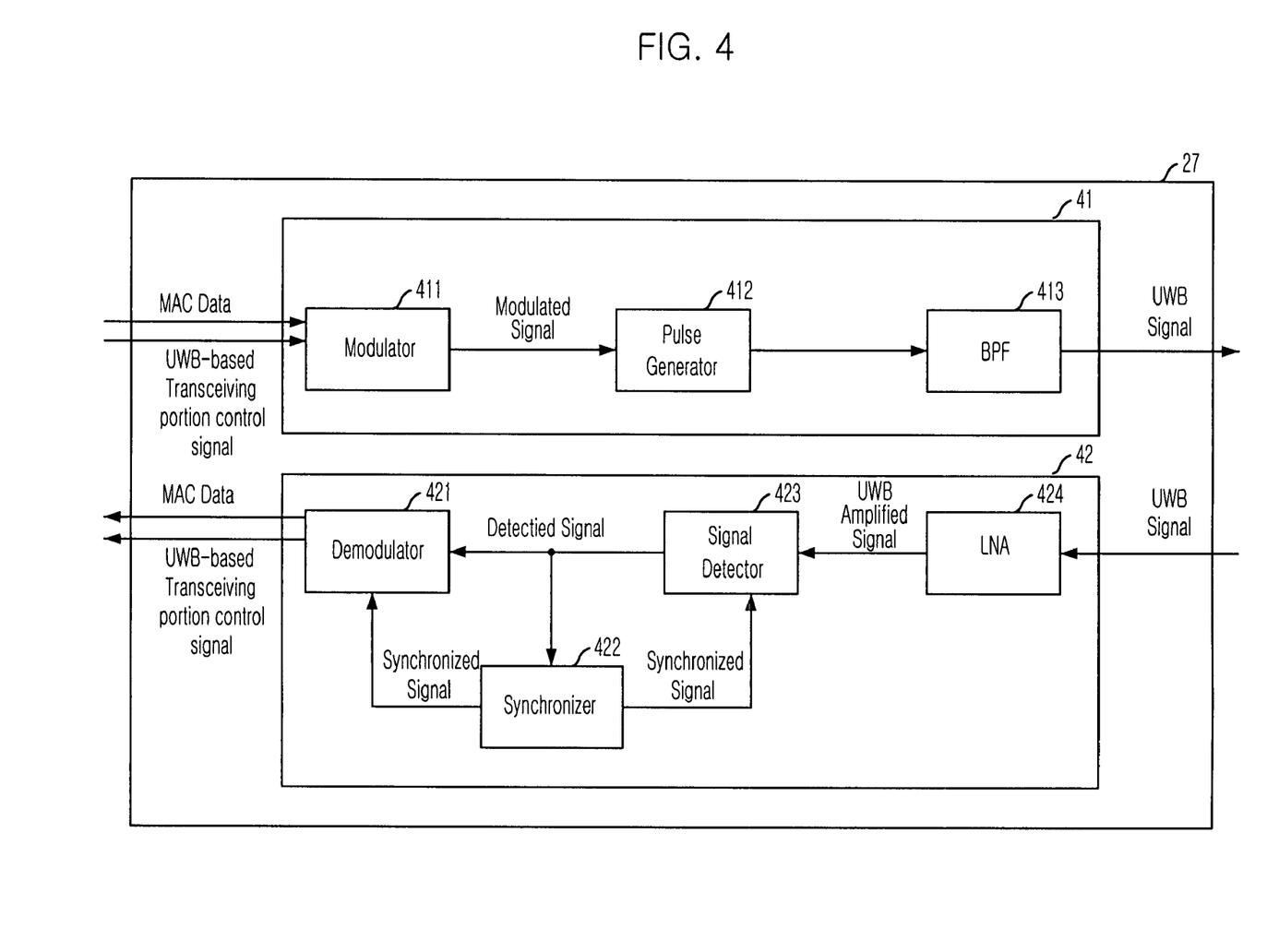
FIG. 4 is a block diagram describing an UWB-based transceiving portion in accordance with an embodiment of the present invention.

FIG. 4 is a block diagram describing an UWB-based transceiving portion in accordance with an embodiment of the present invention.

As shown, the UWB-based transceiving portion 27 largely includes a transmitting portion 41 and a receiving portion 42. The transmitting portion 41 includes a modulator 411, a pulse generator 412, and a band pass filter (BPF) 413. The receiving portion 42 includes a low noise amplifier (LNA) 424, a signal detector 423, a synchronizer 422 and a demodulator 421.

First, the modulator 411 performs pulse position modulation (PPM), pulse amplitude modulation (PAM), binary phase shift keying (BPSK) modulation, quadrature phase shift keying (QPSK) modulation, direct sequence code (DSC) modulation to convert the MAC data of the IEEE 802.15.3 MPDU frame, which are from the IEEE 802.15.3 MAC portion 26, into UWB signals. Then, it modulates the MAC data into pulse signals having a narrow bandwidth and transmits them to the pulse generator 412.

The pulse generator 412 adds time information to the modulated signals transmitted from the modulator 413 and generates a series of pulse signals.

The BPF 413 removes noise by passing signals of two frequency bands of 3.1 to 5.15 GHz and 5.825 to 10.6 GHz among the pulse signals transmitted from the pulse generator 412 and removing signals out of the two frequency bands and transmits UWB signals without noise through the antenna 28.

Meanwhile, the LNA 424 performs low noise amplification on the UWB signals from the antenna 28 and transmits the resultant signals to the signal detector 423.

The signal detector 423 receives the amplified UWB signals from the LNA 424 and detects signals in a correlation method, calculates signal-to-noise ratio (SNR) and phase difference, and transmits the detected signals to the synchronizer 422 and demodulator 421.

The synchronizer 422 synchronizes the pulses of the signals transmitted from the signal detector 423 to thereby obtain synchronized signals and transmits the synchronized signals to the signal detector 423 and demodulator 421.

The demodulator 421 demodulates signals from the signal detector 423 into a series of pulse signals based on the synchronized signals transmitted from the synchronizer 422, converts the pulse signals into MAC receiving data of the IEEE 802.15.3 MPDU frame, and transmits the MAC receiving data to the IEEE 802.15.3 MAC portion 26.

The UWB-based wireless bridge of the present invention, which is described in the above, can build a high-speed wired/wireless integrated network by converting data from a wired serial device connected with a serial port at home or in office into UWB signals, transmitting the UWB signals wirelessly, and inverting the UWB signals into wired serial data. Also, it can transmit high-quality audio/video signals from a wired device wirelessly.

While the present invention has been described with respect to certain preferred embodiments, it will be apparent to those skilled in the art that various changes and modifications may be made without departing from the scope of the invention as defined in the following claims.

What is claimed is:

1. An ultra wide band (UWB)-based wireless bridge, comprising:
  a physical layer processing means for encoding a first physical layer signal transmitted from a serial bus device connected through wire into a first link layer data and decoding a second link layer data into a second physical layer signal;

a protocol converting means for separating the first link layer data transmitted from the physical layer processing means into a first isochronous data and a first asynchronous data, performing path establishment and synchronization, multiplexing the first isochronous data and the first asynchronous data into a first protocol adaptation layer (PAL) data of an IEEE 802.15.3 media access control (MAC) service data unit (MSDU) frame, and converting the first PAL data into a first MAC data of an IEEE 802.15.3 MAC protocol data unit (MPDU) frame, converting a second MAC data into a second PAL data, separating the second PAL data into a second isochronous data and a second asynchronous data, performing path establishment and synchronization, and multiplexing the second isochronous data and the second asynchronous data into the second link layer data;

a UWB signal transceiving means for converting the first MAC data transmitted from the protocol converting means into first IJWB signals, transmitting the first LIWB signals through an antenna, and converting second UWB signals received through the antenna into the second MAC data; and a controlling means for controlling and managing the physical layer processing means, the protocol converting means, and the UWB signal transceiving means, wherein the protocol converting means includes a MAC transmitting means for converting the first PAL data into the first MAC data, the MAC transmitting means to transmit at least one of command data or the first asynchronous data based on a Carrier Sense Multiple Access with Collision Avoidance (CSMA/CA) method in a selective contention access (CA) period established in a piconet superframe, and to transmit at least one of the command data, management data, the first asynchronous data or real-time isochronous data based on a Time Division Multiple Access (TDMA) method in a basic channel time allocation (CTA) period.

2. The UWB-based wireless bridge as recited in claim 1, wherein the protocol converting means includes:

a link layer processing means for separating the first link layer data transmitted from the physical layer processing means into the first isochronous data and the first asynchronous data, and multiplexing the second isochronous data transmitted from a serial bus bridge means and the second asynchronous data into the second link layer data;

a first transaction processing means for converting the first asynchronous data transmitted from the link layer processing means into a first asynchronous sub-action data, and converting a second asynchronous sub-action data into the second asynchronous data;

a serial bus bridge means for establishing a first path by analyzing first frame information of the first asynchronous data and the first isochronous data which are transmitted from the first transaction processing means and the link layer processing means, performing synchronization based on a first cycle timer, establishing a second path by analyzing second frame information of the second asynchronous sub-action data and the second isochronous data, performing synchronization based on a second cycle timer;

a second transaction processing means for converting the first asynchronous sub-action data transmitted from the serial bus bridge means into the first asynchronous data, and converting the second asynchronous data into the second asynchronous sub-action data;

a PAL processing means for multiplexing the first isochronous data and the first asynchronous data transmitted from the serial bus bridge means and the second transaction processing means, converting the multiplexed data into the first PAL data, and separating the second PAL data into the second isochronous data and the second asynchronous data; and an MAC processing means for converting the first PAL data transmitted from the PAL processing means into the first MAC data, and converting the second MAC data transmitted from the UWB signal transceiving means into the second PAL data.

3. The UWB-based wireless bridge as recited in claim 2, wherein the MAC processing means includes:

the MAC transmitting means for converting the first PAL data transmitted from the PAL processing means into the first MAC data at a corresponding time point based on the CSMA/CA method or the TDMA method and transmitting the first MAC data to the UWB signal transceiving means; and an MAC receiving means for converting the second MAC data transmitted from the UWB signal transceiving means into the second PAL data, separating the second PAL data into control data, management data, the second asynchronous data and the second isochronous data, transmitting the second asynchronous data and the second isochronous data to the PAL processing means, and performing a function of managing a management information base (MIB) of an MAC layer, a function of scanning a UWB-based piconet coordinator, a function of performing piconet synchronization/combination with other UWB devices, and a function of authentication by using the control data and the management data.

4. The UWB-based wireless bridge as recited in claim 3, wherein the MAC transmitting means includes:

a transmission storing means for temporarily storing the first PAL data, the control data and the management data which are transmitted from the PAL processing means and a transmission protocol managing means, and transmitting the first PAL data, the control data and the management data to a transmission protocol controlling means sequentially;

the transmission protocol managing means for generating the control data based on the control of the controlling means and generating control/management data for communication with a UWB-based piconet coordinator, and transmitting the control data and the control/management data to the transmission storing means;

the transmission protocol controlling means for transmitting the first PAL data transmitted from the transmission storing means and the control/management data to an MAC data generating means at a corresponding time point based on the CSMA/CA method or the TDMA method; and the MAC data generating means for converting the data transmitted from the transmission protocol controlling means into the first MAC data and transmitting the first MAC data to the UWB signal transceiving means.

5. The UWB-based wireless bridge as recited in claim 4, wherein the transmission protocol controlling means transmits the command data and/or the first asynchronous data to the MAC generating means among the first PAL data transmitted from the transmission storing means based on the CSMA/CA method in the selective contention access (CA) period established in the piconet superframe; and transmits the command data, the management data, the first asynchronous data and/or real-time isochronous audio/video data to the MAC generating means among the first PAL data transmitted from the transmission storing means based on the TDMA method in the basic channel time allocation (CTA) period.

6. The UWB-based wireless bridge as recited in claim 3, wherein the MAC receiving means includes:
 a PAL data converting means for converting the second MAC data transmitted from the UWB signal transceiving means into the second PAL data by performing frame address identification, redundant frame detection, and frame check sequence;
 a reception protocol controlling means for separating the second PAL data transmitted from the PAL data converting means into the control data, the management data, the second asynchronous data, and the second isochronous data, and transmitting the second asynchronous data and the second isochronous data to a reception storing means and transmitting the control data and the management data to a reception protocol management means;
 the reception storing means for temporarily storing the second asynchronous data and the second isochronous data transmitted from the reception protocol controlling means and transmitting the stored asynchronous data and the stored isochronous data to the PAL processing means sequentially; and
 the reception protocol managing means for performing a function of managing the MIB of an MAC layer, a function of scanning the UWB-based piconet coordinator, a function of performing piconet synchronization/combination with other UWB-based devices and a function of authentication by using the control data and the management data transmitted from the reception protocol controlling means.

7. The UWB-based wireless bridge as recited in claim 1, wherein the UWB signal transceiving means includes:
 a UWB signal transmitting means for converting the first MAC data transmitted from the protocol converting means into the first UWB signals and transmitting the first UWB signals through the antenna; and
 a UWB signal receiving means converting the second UWB signals transmitted through the antenna into the second MAC data and transmitting the second MAC data to the protocol converting means.

8. The UWB-based wireless bridge as recited in claim 7, wherein the UWB signal transmitting means includes:
 a modulating means for modulating the first MAC data transmitted from the protocol converting means into a pulse signal of a UWB signal band;
 a pulse generating means for generating a series of pulse signals by adding time information to a modulated signal transmitted from the modulating means; and
 a filtering means for removing noise from the pulse signals transmitted from the pulse generating means and transmitting the pulse signals without noise through the antenna.

9. The UWB-based wireless bridge as recited in claim 8, wherein the UWB signal receiving means includes:
 a low noise amplifying means for performing low noise amplification on a UWB signal transmitted from the antenna;
 a signal detecting means for detecting a UWB signal transmitted from the low noise amplifying means and calculating a signal to noise ratio and phase difference;
 a synchronizing means for synchronizing a pulse of the signal transmitted from the signal detecting means, generating a synchronized signal to compensate time delay generated on an UWB channel, and transmitting the synchronized signal to the signal detecting means; and
 a demodulating means for demodulating the signal transmitted from the signal detecting means into a series of pulse signals based on the synchronized signal transmitted from the synchronizing means, converting the pulse signals into MAC data, and transmitting the MAC data to the protocol converting means.

* * * * *